Feb. 8, 1927. 1,617,152
J. GAIR
WHEEL FOR VEHICLES AND METHOD OF MAKING THE SAME
Filed Feb. 28, 1924
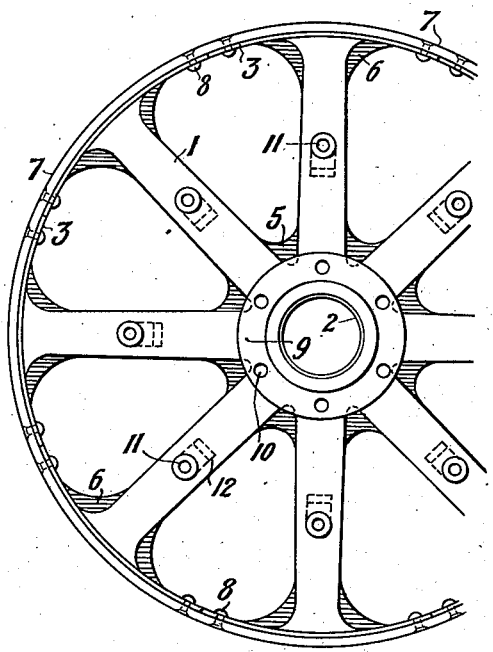
FIG.2. FIG.1.
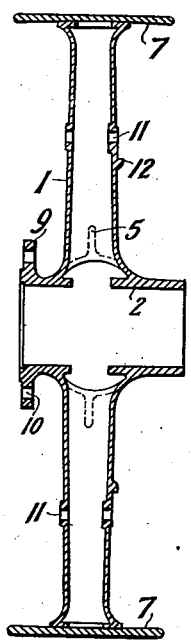
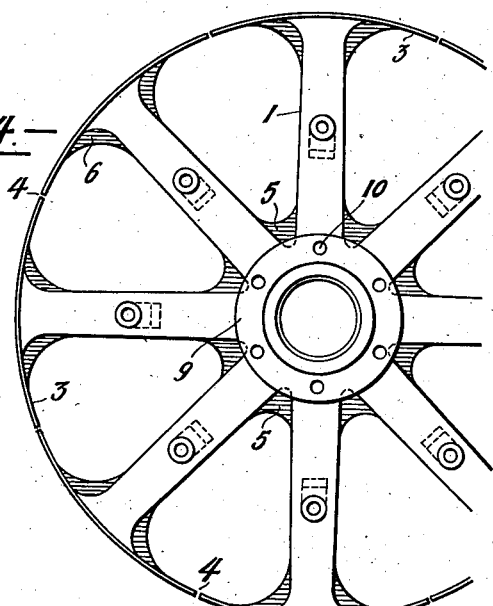
FIG.4.
FIG.3.
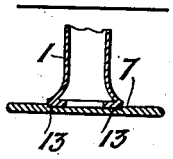

Patented Feb. 8, 1927.

1,617,152

UNITED STATES PATENT OFFICE.

JAMES GAIR, OF ACTON, LONDON, ENGLAND.

WHEEL FOR VEHICLES AND METHOD OF MAKING THE SAME.

Application filed February 28, 1924, Serial No. 695,732, and in Great Britain March 27, 1923.

This invention relates to wheels for vehicles, and particularly to that type of wheel having the spokes and rim cast integral with the hub, and a separate metal tyre afterwards shrunk on to the exterior of the cast rim.

According to this invention, the rim which is formed integral with the spokes, is divided between the spokes so as to form minute gaps in the said rim. This permits each spoke and segmental portion of the rim, thus separated, to contract freely when cooling after the casting operation, and thus avoid fracture or unnecessary strain and fatigue of the spokes and rim segments during the cooling process. After contraction of the metal has taken place upon cooling the periphery of the segments forming the rim may be machined, and the metal tyre which has been expanded by heat is then applied over the periphery of the said rim segments and permitted to contract by cooling, thus putting the whole of the central portion of the wheel under compression and closing up the minute gaps between the segments, the ends of which may thus be caused to abut against each other.

The pressure imparted by the application of the tyre may be of any predetermined strength, by regulating the heat of the tyre when applied, or by forcing the heated tyre on to the segmental rim by means of a press or other apparatus. Preferably, the periphery of the segmental rim is machined, in order to correct the inequalities in shrinkage and to prepare a good surface for the reception of the tyre. After the application of the tyre its periphery may also be machined, thus correcting the slight degree of flatness between the spokes due to the difference in radial resistance of the inner portion of the wheel.

The gaps between the ends of the segments may be formed either during the casting operation, or they may be cut through the rim while the casting is still hot. It is preferable for the compression due to the shrinkage of the tyre to be sufficient to absolutely close these gaps, and thus a wheel is produced which is practically homogeneous. This compound wheel has all the advantages of a casting where compression is received, and the advantage of great tensile strength in the tyre surrounding the cast portion.

When the tyre has been applied, holes may be drilled through the tyre and rim, preferably through the ends of the segments, and rivets then inserted firmly lock the tyre to the rim.

The invention will be described with reference to the accompanying drawings.

Fig. 1 is an elevation, and Fig. 2 a vertical section, of the wheel and tyre, and Fig. 3 is a detail view showing the application of a modified shape of tyre. Fig. 4 is an elevation of the cast central portion of the wheel before the application of the tyre.

The spokes 1 extend from the tubular hub 2 to the segmentally divided rim 3. Gaps 4 separate the various segments from each other. Stiffening webs 5 connect adjacent spokes together near the hub, and stiffening webs 6, connecting the spokes with the segments of the rim, distribute the shocks received on the tyre to the spokes more evenly than if the connection between the rim and the spokes were less extended.

The tyre 7, which is shrunk on to the cast metal portion of the wheel, is of such interior diameter as to contract when afterwards cooled sufficiently to place the central portion of the wheel in the desired degree of compression. This amount of compression may be determined by the difference between the inner diameter of the tyre and the outer diameter of the segments of the rim. The rivets for locking the tyre to the segmental rim are shown at 8.

The hub 2 may be constructed with a flange 9 formed with holes 10 for the attachment of a cap or other fitting. Further, the spokes 1, which in the example are shown to be tubular, may have apertures drilled at 11, and be formed with projections 12 in order to enable a brake or other wheel to be secured to the spokes by bolts passing through the said holes 11.

In the modification shown at Fig. 3, the tyre 7 is grooved at 13, to receive the segments of the rim and prevent accidental displacement of the said tyre 7. A rubber tyre can subsequently be fixed on the metal tyre 7 by any well known means.

What I claim as my invention and desire to secure by Letters Patent is:—

1. A cast wheel for vehicles; comprising a rim, a hub, and spokes extending from said hub to said rim all in one homogeneous casting, said rim divided transversely between each two spokes to constitute a plurality of segments having narrow gaps between them, and a separate metal tyre positioned over said segmental rim securing the whole of the central portion of said wheel under compression with the segments in abutment.

2. A cast wheel for vehicles; comprising a rim, a hub, and spokes extending from said hub to said rim all in one homogeneous casting, said rim divided transversely centrally between each two spokes to constitute a plurality of segments the ends of said segments abutting, a separate metal tyre positioned over said segmental rim securing the ends of said segments in abutment and placing the whole of the central portion of said wheel under compression, and rivets securing the ends of said segments and said metal tyre.

3. The method of construction of a wheel for vehicles; consisting in forming a rim, hub, and spokes extending from said hub to said rim by casting in one homogeneous piece, forming divisions prior to the cooling of the cast metal through said rim said divisions being located centrally between each two spokes to constitute a rim composed of a plurality of segments the ends of the latter being separated by small gaps, constructing a separate metal tyre of such internal diameter that when heated it can be passed externally over said segmental rim, heating said tyre and placing it over the rim and then permitting said tyre to cool to close up said gaps between the ends of said segments of said rim into abutment contact and place the whole of the central portion of said wheel under compression.

4. The method of construction of a wheel for vehicles; consisting in forming a rim, a hub, and spokes extending from said hub to said rim by casting in one homogeneous piece, forming divisions prior to the cooling of the cast metal through said rim said divisions being located centrally between each two spokes to constitute a rim composed of a plurality of segments the ends of the latter being separated by small gaps, machining the periphery of said segmental rim to correct inequalities in shrinkage and to prepare a good surface for the reception of the tyre, constructing a separate metal tyre of such internal diameter that when heated it can be passed externally over said segmental rim, heating the tyre and placing it over the rim then permitting said tyre to cool to close up said gaps between the ends of said segments of said rim, to bring said ends into abutment and place the whole of the central portion of said wheel under compression, and then machining the external periphery of said metal tyre to correct the slight degree of flatness between the spokes due to the difference in radial resistance of the inner portion of the wheel.

5. The method of constructing a wheel for vehicles consisting in casting a hub, spokes extending from the hub and segmental rim sections as one homogeneous piece, the segmental rim sections being each integrally associated with a spoke and the ends of said sections separated by narrow gaps allowing said casting to cool and then shrinking a tire over said rim sections whereby said gaps are closed and the rim, spokes and hub subjected to a uniform pressure.

In witness whereof I have hereunto set my hand.

JAMES GAIR.